US010927229B2

(12) United States Patent
Wang et al.

(10) Patent No.: US 10,927,229 B2
(45) Date of Patent: Feb. 23, 2021

(54) METHOD FOR PREPARING NANOPOROUS POLYSULFONE-BASED POLYMERS

(71) Applicant: NANJING TECH UNIVERSITY, Jiangsu (CN)

(72) Inventors: Yong Wang, Jiangsu (CN); Weihong Xing, Jiangsu (CN); Nanping Xu, Jiangsu (CN)

(73) Assignee: NANJING TECH UNIVERSITY, Jiangsu (CN)

(*) Notice: Subject to any disclaimer, the term of this patent is extended or adjusted under 35 U.S.C. 154(b) by 87 days.

(21) Appl. No.: 16/099,182

(22) PCT Filed: Jun. 30, 2017

(86) PCT No.: PCT/CN2017/090988
§ 371 (c)(1),
(2) Date: Nov. 5, 2018

(87) PCT Pub. No.: WO2018/126626
PCT Pub. Date: Jul. 12, 2018

(65) Prior Publication Data
US 2019/0211175 A1   Jul. 11, 2019

(30) Foreign Application Priority Data
Jan. 4, 2017   (CN) .......................... 201710003034.X

(51) Int. Cl.
C08J 9/28       (2006.01)
C08J 9/00       (2006.01)
(Continued)

(52) U.S. Cl.
CPC ................ C08J 9/28 (2013.01); C08G 75/20 (2013.01); C08G 75/23 (2013.01); C08J 9/00 (2013.01);
(Continued)

(58) Field of Classification Search
CPC .......................................................... C08J 9/28
(Continued)

(56) References Cited

U.S. PATENT DOCUMENTS

2006/0115644 A1   6/2006   Ma et al.
2016/0008528 A1   1/2016   Roy et al.

FOREIGN PATENT DOCUMENTS

CN   101704957   5/2010
CN   101735613   6/2010
(Continued)

OTHER PUBLICATIONS

CN106674580 A translation (Year: 2017).*
(Continued)

Primary Examiner — Duc Truong
(74) Attorney, Agent, or Firm — JCIPRNET

(57) ABSTRACT

The present invention relates to a method for preparing nanoporous polysulfone-based polymers, including: a copolymer of a polysulfone polymer and a polar polymer is immersed into a compound swelling agent, and maintained for at least 1 minute above room temperature; the compound swelling agent is a "solvent pair" composed of the mixture of solvent A and solvent B; the solvent A has high affinity with the polysulfone polymer; and the solvent B has high affinity with the polar polymer; the treated copolymer is taken out from the compound swelling agent and then dried to remove the solvent to obtain the nanoporous polysulfone-based polymers.

10 Claims, 2 Drawing Sheets

(51) Int. Cl.
*C08L 81/06* (2006.01)
*C08G 75/20* (2016.01)
*C08G 75/23* (2006.01)
*C08L 87/00* (2006.01)

(52) U.S. Cl.
CPC ....... *C08L 81/06* (2013.01); *C08J 2201/0502* (2013.01); *C08J 2201/0504* (2013.01); *C08J 2205/042* (2013.01); *C08J 2381/06* (2013.01); *C08J 2387/00* (2013.01); *C08J 2471/02* (2013.01); *C08L 2203/14* (2013.01)

(58) Field of Classification Search
USPC ........................................................ 528/373
See application file for complete search history.

(56) References Cited

FOREIGN PATENT DOCUMENTS

| CN | 101912741 | 12/2010 |
|---|---|---|
| CN | 102516583 | 6/2012 |
| CN | 102764600 | 11/2012 |
| CN | 103120903 | 5/2013 |
| CN | 103408783 | 11/2013 |
| CN | 106674580 | 5/2017 |

OTHER PUBLICATIONS

Liu et al., "Preparation and Characterization of Polysulfone Ultrafiltration Membrane", Journal of Zhengzhou University (Engineering Science), Sep. 2002, pp. 1-5.

Yin, et al., "Membranes with Highly Ordered Straight Nanopores by Selective Swelling of Fast Perpendicularly Aligned Block Copolymers", ACS Nano, Oct. 16, 2013, pp. 9961-9974.

Wang, "Nondestructive Creation of Ordered Nanopores by Selective Swelling of Block Copolymers: Toward Homoporous Membranes", Accounts of Chemical Research, Jun. 28, 2016, pp. 1401-1408.

Dizman, et al., "Recent advances in the preparation of functionalized polysulfones", Polym. Int., May 20, 2013, pp. 991-1007.

"International Search Report (Form PCT/ISA/210)", dated Oct. 12, 2017 with English translation thereof, pp. 1-6.

* cited by examiner

METHOD FOR PREPARING NANOPOROUS POLYSULFONE-BASED POLYMERS

CROSS-REFERENCE TO RELATED APPLICATION

This application is a 371 application of International PCT application serial no. PCT/CN2017/090988, filed on Jun. 30, 2017, which claims the priority benefit of Chinese application no. 201710003034.X, filed on Jan. 4, 2017. The entirety of each of the abovementioned patent applications is hereby incorporated by reference herein and made a part of this specification.

BACKGROUND

Technical Field

The present invention relates to a method for preparing porous polymers, in particular relating to a method for preparing nanoporous polymers.

Description of Related Art

Nanoporous polymers have broad application prospects in separation, catalysis, tissue engineering, biomedicine and other fields due to their small pore size, high porosity, large specific surface area and high specific strength. In these applications, the pore size, pore size distribution and pore wall surface properties of a porous polymer determine its performance. However, due to the limitation of the pore-forming methods, the nanoporous polymers generally face problems such as wide pore size distribution, difficulty in reducing the pore diameter to less than 100 nm, difficulty in large-scale preparation due to a complicated preparation process, as well as high costs.

The current methods for preparing nanoporous polymers mainly include phase inversion (solvent or temperature induction), foaming, templating, and selective removal of some components of the phase-separated block copolymers. These methods have been applied in some specific areas, but they still have some deficiencies or just have advantages in one or some aspects. For example, by using the widely used polymer foaming method, it is difficult to obtain pores having a size of 100 nm or less, and most of the pores obtained with the method have a closed cell structure, and a dense skin layer is formed on the surface, so porous polymers obtained by the foaming method do not have permeability and their pores cannot accommodate or transfer substances. Thus, they cannot be applied to areas involving fluid transport, such as separation, catalysis and drug release.

In addition, polysulfone polymer chains contain sulfone groups, aromatic rings and ether bonds and have excellent physical and chemical properties, so they are widely used in medical devices, biomolecular detection and diagnostics, electronics and electric appliances, aeronautics and astronautics, traffic and transportation, membrane products and hollow fibers. However, due to their high glass transition temperature and the high chemical stability of their molecular structure, it is difficult for them to carry out chemical reactions under mild conditions. Polysulfone polymers are more difficult to be prepared into nanoporous materials. It is difficult to obtain uniform, stable and well-connected nanoporous materials through the existing methods.

Therefore, there is an urgent need to develop a preparation method suitable to prepare polysulfone polymers into nanoporous polymers which are characterized by high stability, uniform pore size, good connectivity and narrow pore size distribution and are suitable for large-scale preparation.

SUMMARY

The objective of the present invention is to provide a method for preparing nanoporous polymers mainly composed of polysulfone polymers.

The objective of the present invention is to provide a method for preparing nanoporous polymers mainly composed of polysulfone polymers.

1) Immerse the copolymer of a polysulfone polymer and a polar polymer into a compound swelling agent, and maintain this for at least 1 minute above room temperature; the said compound swelling agent is a "solvent pair" composed of the mixture of solvent A and solvent B; the said solvent A has high affinity with the polysulfone polymer; and the said solvent B has high affinity with the polar polymer;

2) Take the copolymer treated in Step 1) out from the compound swelling agent and then dry it to remove the solvent to obtain the said nanoporous polysulfone-based polymer.

In the preparation method described in the present invention, the copolymer of the polysulfone polymer and the polar polymer mentioned in Step 1) may be a plurality of products obtained from polysulfone polymers and a plurality of polar polymers through a plurality of copolymerization methods. The said polysulfone polymers refer to polymers having sulfonyl groups in their molecular structures, and the commonly used polysulfone polymers are polysulfone, polyethersulfone and polyphenylene sulfide. The said polar polymers may be water-soluble polymers, alcohol-soluble polymers and the like. The said copolymerization method may be random, graft or block copolymerization. In a preferred embodiment of the present invention, the copolymer is the copolymer of a polysulfone polymer and a water-soluble polymer. In the more preferred embodiment, the said water-soluble polymer may be selected from polyethylene glycol (PEG), methoxy polyethylene glycol (MPEG), polypropylene glycol (PPG) or polyvinyl pyrrolidone (PVP); and the most preferred is PEG.

In a preferred embodiment of the invention, in the copolymer of the said polysulfone polymer and the said polar polymer, the volume of the polar polymer accounts for 5-40% of the total copolymer volume.

In the preparation method described in the present invention, the form of the copolymer mentioned in Step 1) is not particularly limited and may be a bulk, a film, fiber, a granule, powder or the like.

In the preparation method described in the present invention, the solvent A mentioned in the compound swelling agent in Step 1) may be selected from various existing solvents having high affinity with polysulfone polymers, including but not limited to any one of acetic acid, DMF, DMAc, DMSO, acetone, methyl ethyl ketone or acetonitrile, or a mixture of any two or more thereof; the solvent B mentioned in the compound swelling agent may be selected from the existing variety of solvents having high affinity with polar polymers, including but not limited to water, alcoholic or ester liquid organic solvents containing 1-8 carbons in the molecular chain, and specifically, it is any one of methanol, ethanol, isopropanol, n-hexanol and methyl formate, or a mixture of any two or more thereof. In a preferred embodiment of the invention, the said solvent A is any one of acetic acid, DMAc, DMSO or acetone, most preferably acetone or acetic acid; the said solvent B is any one of water, ethanol, isopropanol or hexahydrate, most preferably ethanol.

In the method described in the present invention, adjusting the volume ratio of solvents A and B in the compound swelling agent mentioned in Step 1) can make the product obtain different pore-forming effects. In the preferred embodiment of the invention, the volume ratio of solvents A and B is preferably controlled at 5:95-95:5; more preferably at 5:95-25:75.

In the preparation method described in the present invention, the most preferred "solvent pair" includes: the "solvent pair" comprised of acetone and ethanol in a volume ratio of 20:80, DMF and water in a volume ratio of 10:90, acetic acid and isopropanol in a volume ratio of 15:85, DMSO and n-hexanol in a volume ratio of 10:90, or DMAc and ethanol in a volume ratio of 5:95.

In the preparation method described in the present invention, the pore size and distribution state of the obtained porous polymer can be adjusted by adjusting the immersion temperature and/or the immersion time described in Step 1); in a preferred embodiment of the present invention, the temperature described in Step 1) is preferably controlled between 30-80° C.; the said time is preferably controlled between 1 minute-24 hours, more preferably between 0.1-12 hours.

In a preferred embodiment of the present invention, it is preferred to first place the copolymer taken out from the compound swelling agent into a low boiling point solvent to be substituted before the drying mentioned in Step 2) and then further remove the solvent remaining in the copolymer.

In a preferred embodiment of the invention, the drying temperature described in Step 2) is controlled at 30-80° C.

The present invention is based on the mechanism that the strong mutual repulsion between a polysulfone polymer and a polar polymer (such as PEG, PVP, etc.) causes microscopic phase separation and a compound solvent is used to regulate the degree of swelling of the two phases to produce nanopores. Polysulfone polymer molecules are rich in benzene ring, which is a rigid molecular structure and highly hydrophobic. Polar polymers such as PEG are flexible molecules having high affinity with water. Due to their great difference in chemical structure and physicochemical properties, the copolymer of the two substances obtained by chemical bonding has a strong tendency to generate phase separation, and the microdomains formed by polar polymer chain segments in the copolymerization product are dispersed in the continuous phase of the polysulfone polymer. The inventor of the present invention has found in the study of pore-forming solvents that, based on the physiochemical properties of polysulfone and polar polymers, it is preferred to select solvents to treat the copolymer, which have high affinity with one chain segment in the copolymer while having weak affinity with another chain segment. At the same time, the inventor has found that treating the copolymer with any solvent of any nature alone cannot have satisfactory effects and can't make the polysulfone-based copolymer obtain the pore-opening effect. When a solvent having high affinity with polysulfone is used alone, the polysulfone-based copolymer undergoes micellization in the solvent and its overall structure is destroyed. When a solvent having high affinity with the polar polymer is used alone, the swelling of the PEG microdomain is inhibited and pores cannot be formed because the chain segment of the bulk phase of the polysulfone lacks sufficient mobility. Through a large number of tests, the inventor of the present invention has verified that it is necessary to select the mixture of a pro-polysulfone solvent and a solvent affinitive with polar polymers such as PEG to form a "solvent pair" in a specific ratio, so as to obtain the optimal pore-forming effect of the polysulfone-based copolymer. In the method described in the present invention, solvent A in the compound swelling agent mentioned in Step 1) is a pro-polysulfone solvent and has moderate-to-strong swelling effects on the polysulfone polymer; and solvent B is a solvent affinitive with the polar polymer and has a strong swelling effect on polar polymers (such as PEG, PPG, etc.) but has a weak swelling effect on the polysulfone polymer. When the copolymer is treated with a "solvent pair" consisting of the said solvent A and the said solvent B, the solvent B is continuously enriched in the microdomain of polar polymers such as PEG to generate an osmotic pressure. Solvent A produces a plasticizing effect on the bulk phase of the polysulfone, so the mobility of the polysulfone molecular chain is improved. Under the osmotic pressure accumulated in the polar polymer microdomain, the bulk phase of the polysulfone undergoes local deformation. After the removal of the solvents, the polar polymer molecular chain collapses, thus creating pores. The size of the pores is determined by the size of the polar polymer domains prior to solvent treatment, typically between 10 and 100 nm, and can be adjusted by changing the composition of the copolymer, the composition of the solvent pair as well as the treatment time and temperature.

The preparation method of the nanoporous polysulfone-based polymer described in the present invention is a direct solvent treatment process and has the following outstanding advantages over the existing preparation methods (technologies): (1) The preparation process is extremely simple, only needs two simple steps: soaking and drying, and is easy for enlargement and scale preparation; (2) Pores have a uniform size distributed in the range of 10-100 nm and are interconnected, thus facilitating fluid exchange and transport; (3) Polar polymer molecular chains are redistributed to the surface and pore walls of the copolymer material during the pore formation process, giving the resulted porous material a high degree of hydrophilicity, which is very beneficial for applications in water environments such as water treatment and biomedicine; (4) Because the glass transition temperature of the polysulfone polymer is close to 200 degrees Celsius and the strength of the polymer is high, the bulk material of the porous polymer prepared with the method described in the invention is polysulfone, so the product can maintain high thermal stability and mechanical stability; (5) The method is suitable for various forms of polymer raw materials: different initial forms of polysulfone-based copolymers (including macroscopic bulk materials) can produce nanopores through the method described in the present invention; (6) No chemical reaction is required and there is no substance loss during the pore-forming process, so the copolymer can be recycled after pore formation.

In summary, compared with other methods for preparing nanoporous polymers, the method described in the present invention has significant advantages in terms of preparation process, structural regulation, product performance and applicability.

DESCRIPTION OF THE EMBODIMENTS

Implementation Case 1

A method for preparing nanoporous polysulfone-based polymers, whose steps include:

1) The block copolymer film of polysulfone and PEG having a PEG volume ratio of 20% was immersed in an ethanol/acetone solvent pair (having an acetone volume ratio of 20%) at 70° C. for 5 hours;

2) The copolymer film was taken out from the solvent and dried at 30° C. for 6 hours to obtain a nanoporous polymer film.

Figure 1:
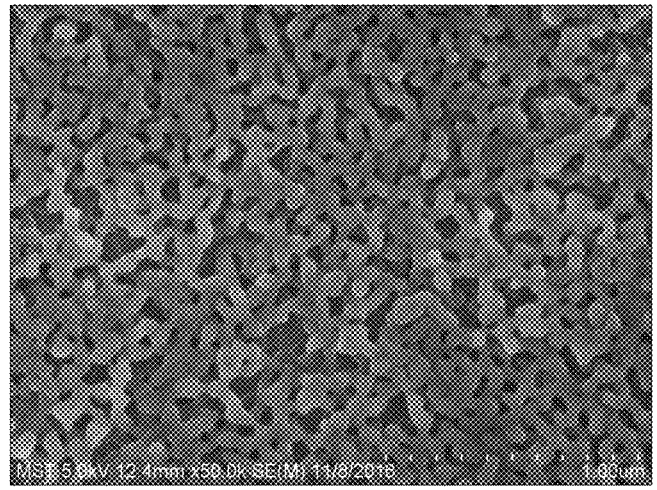
FIG. 1 is a scanning electron micrograph of a nanoporous polysulfone-based copolymer prepared with the method described in Implementation Case 1.

The porous polymer obtained in the Implementation Case was characterized by the scanning electron microscopy, as shown in FIG. 1. The dense polymer before being treated with the ethanol/acetone solvent pair has been transformed into a highly porous structure, the pores are connected to each other, and the pore diameter is less than 100 nm. At the same time, the water contact angle of the surface of the copolymer film was reduced from 85° before ethanol treatment to 50° after the treatment, indicating that the obtained nanoporous material has good hydrophilicity.

Implementation Case 2

A method for preparing nanoporous polysulfone-based polymers, whose steps include:

1) The graft copolymer bulk of polysulfone and PEG having a PEG volume ratio of 35% was immersed in a water/DMF solvent pair (having a DMF volume ratio of 10%) at 60° C. for 24 hours;

2) The copolymer film was taken out from the solvent and dried at 60° C. for 2 hours to obtain the nanoporous polymer bulk material.

Figure 2:
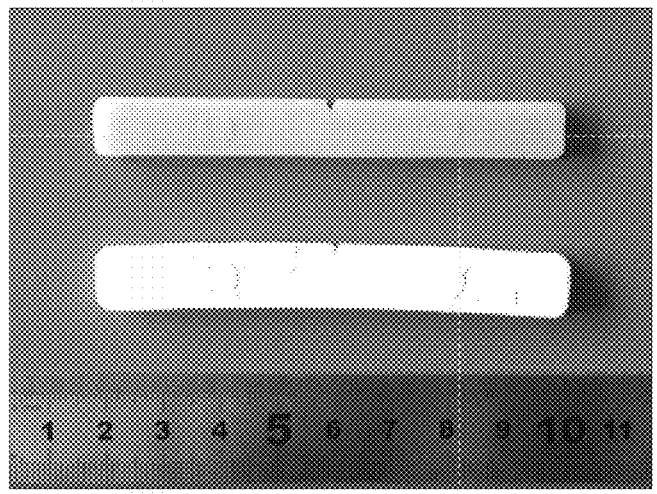
FIG. 2 is the comparison of the appearance and shape of nanoporous polysulfone bulk materials prepared with the method described in Implementation Case 2 before and after solvent treatment.
Figure 3:
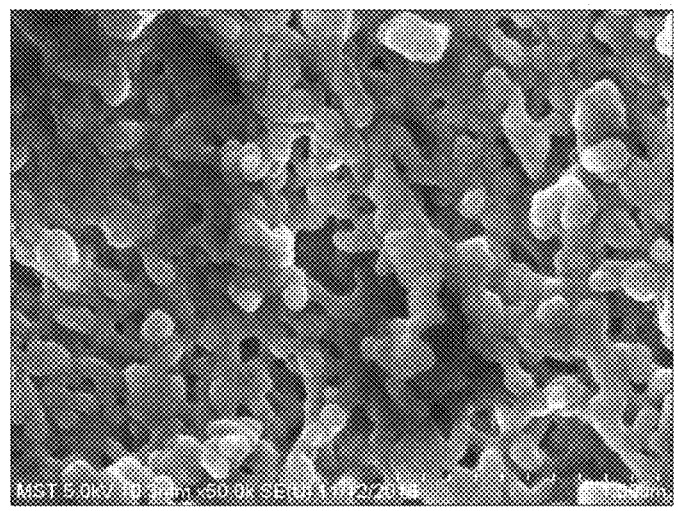
FIG. 3 is a scanning electron micrograph of the inside of a nanoporous polysulfone bulk material prepared with the method described in Implementation Case 2.

In the Implementation Case, after treatment with the said water/DMF solvent pair, the copolymer was turned to milky white and its volume was increased, but its initial structure was basically maintained, as shown in FIG. 2. The bulk treated with the solvent pair was cut open, and its connected nanopores were observed with the scanning electron microscopy. This proves that the entire bulk material has produced pores, as shown in FIG. 3.

Implementation Case 3

A method for preparing nanoporous polysulfone-based polymers, whose steps include:

1) The random copolymer granule of polysulfone and PVP having a PVP volume ratio of 40% was immersed in an isopropyl alcohol/acetic acid solvent pair (having an acetic acid volume ratio of 20%) at 50° C. for 0.1 hours;

2) The copolymer granule was taken out from the solvent and dried at 40° C. for 10 hours to obtain the nanoporous polymer granular material.

Implementation Case 4

A method for preparing nanoporous polysulfone-based polymers, whose steps include:

1) The random copolymer film of polyphenylene sulfide and PEG having a PEG volume ratio of 5% was immersed in a n-hexanol/DMSO solvent pair (having a DMSO volume ratio of 10%) at 80° C. for 15 hours;

2) The copolymer film was taken out from the solvent and then was washed in ethanol at room temperature for 5 minutes and then taken out and dried at 30° C. for 2 hours to obtain a nanoporous polymer film.

Implementation Case 5

A method for preparing nanoporous polysulfone-based polymers, whose steps include:

1) The block copolymer fiber of polyethersulfone and PEG having a PEG volume ratio of 40% was immersed in an ethanol/DMAc solvent pair (having a DMAc volume ratio of 5%) at 30° C. for 24 hours;

2) The copolymer fiber was taken out from the solvent and then was washed in ethanol at room temperature for 5 minutes and then taken out and dried at 30° C. for 2 hours to obtain a nanoporous polymer fiber.

Contrast Example 1

A method for preparing nanoporous polysulfone-based polymers, whose steps are substantially the same as those of Implementation Case 1, except: the ethanol/acetone solvent pair (having an acetone volume content of 20%) in Implementation Case 1 was changed to pure ethanol but the other operations were unchanged. The treated copolymer remained in a compact initial state with no pores on the surface.

Contrast Example 2

Figure 4:
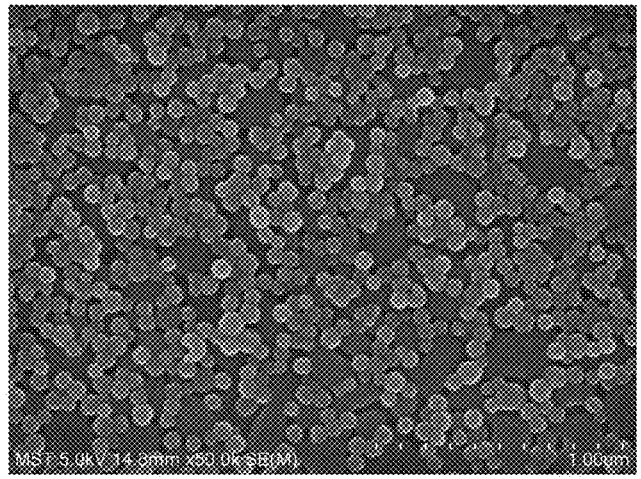
FIG. 4 is a scanning electron micrograph of a nanoporous polysulfone bulk material prepared with the method described in Contrast Example 2.

A method for preparing nanoporous polysulfone-based polymers, whose steps are substantially the same as those of Implementation Case 1, except: the ethanol/acetone solvent pair (having an acetone volume content of 20%) in Implementation Case 1 was changed to pure acetone but the other operations were unchanged. The treated copolymer material could not maintain the initial film state, and no pores were formed but spherical micelles were formed in it. Its microstructure is as shown in FIG. 4.

What is claimed is:

1. A method for preparing nanoporous polysulfone-based polymers, the steps comprising:
    1) immersing a copolymer of a polysulfone polymer and a polar polymer into a compound swelling agent, and maintaining this for at least 1 minute above room temperature; the compound swelling agent is a "solvent pair" composed of the mixture of solvent A and solvent B; the solvent A has high affinity with the polysulfone polymer; and the solvent B has high affinity with the polar polymer;
    2) taking the copolymer treated in Step 1) out from the compound swelling agent and then drying it to remove the solvent to obtain the nanoporous polysulfone-based polymers.

2. The method according to claim 1, wherein the polar polymer mentioned in Step 1) is a water-soluble or alcohol-soluble polymer.

3. The method according to claim 1, wherein in the copolymer of the polysulfone polymer and the polar polymer mentioned in Step 1), the volume of the polar polymer accounts for 5-40% of the entire copolymer volume.

4. The method according to claim 1, wherein the solvent A in the compound swelling agent mentioned in Step 1) is any one selected from the group consisting of acetic acid, N,N-dimethylformamide (DMF), N,N-dimethyl acetamide (DMAc), dimethyl sulfoxide (DMSO), acetone, methyl ethyl ketone or acetonitrile or a mixture of any two or more thereof.

5. The method according to claim 1, wherein the solvent B in the compound swelling agent mentioned in Step 1) is any one selected from the group consisting of water, methanol, ethanol, isopropanol, n-hexanol or methyl formate or a mixture of any two or more thereof.

6. The method according to claim 1, wherein the solvent A in the compound swelling agent mentioned in Step 1) is any one of acetic acid, DMAc, DMSO or acetone; and the solvent B is any one of water, ethanol, isopropanol or n-hexanol.

7. The method according to claim 1, wherein the volume ratio of solvent A and B in the compound swelling agent mentioned in Step 1) is controlled between 5:95 and 95:5.

8. The method according to claim 1, wherein the compound swelling agent mentioned in Step 1) is a solvent pair of acetone and ethanol mixed in a volume ratio of 20:80, a solvent pair of DMF and water mixed in a volume ratio of 10:90, a solvent pair of acetic acid and isopropanol mixed in a volume ratio of 15:85, a solvent pair of DMSO and n-hexanol mixed in a volume ratio of 10:90, or a solvent pair of DMAc and ethanol mixed in a volume ratio of 5:95.

9. The method according to claim 1, wherein the temperature mentioned in Step 1) is controlled between 30 and 80° C.; the mentioned time is controlled from 1 minute to 24 hours.

10. The method according to claim 1, wherein before the drying mentioned in Step 2), first place the copolymer taken out from the compound swelling agent into a low boiling point solvent to be substituted and then further remove the solvent remaining in the copolymer.

* * * * *